US010755089B2

(12) United States Patent
Aarabi et al.

(10) Patent No.: US 10,755,089 B2
(45) Date of Patent: Aug. 25, 2020

(54) HIERARCHICAL DIFFERENTIAL IMAGE FILTERS FOR SKIN ANALYSIS

(71) Applicant: L'ORÉAL, Paris (FR)

(72) Inventors: Parham Aarabi, Richmond Hill (CA); Angel Jing Yi Zhang, North York (CA)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 16/444,921

(22) Filed: Jun. 18, 2019

(65) Prior Publication Data

US 2019/0311191 A1 Oct. 10, 2019

Related U.S. Application Data

(63) Continuation of application No. 15/589,184, filed on May 8, 2017, now Pat. No. 10,325,146.

(60) Provisional application No. 62/333,258, filed on May 8, 2016.

(51) Int. Cl.

| | |
|---|---|
| ***G06K 9/00*** | (2006.01) |
| ***G06K 9/46*** | (2006.01) |
| ***G06K 9/68*** | (2006.01) |
| ***G06K 9/52*** | (2006.01) |

(52) U.S. Cl.

CPC ....... *G06K 9/00362* (2013.01); *G06K 9/4609* (2013.01); *G06K 9/6857* (2013.01); *G06K 9/527* (2013.01); *G06K 2209/05* (2013.01)

(58) Field of Classification Search

CPC ............... G06K 9/6857; G06K 9/4609; G06K 9/00362; G06K 2209/05; G06K 9/527

See application file for complete search history.

(56) References Cited

U.S. PATENT DOCUMENTS

| | | | |
|---|---|---|---|
| 8,643,641 | B2 | 2/2014 | Passmore |
| 2017/0046591 | A1 | 2/2017 | Lee |

FOREIGN PATENT DOCUMENTS

| | | |
|---|---|---|
| CN | 106875391 A | 6/2017 |
| JP | 2013-078520 | 5/2013 |
| JP | 57573055 | 7/2015 |
| JP | 2017-113140 | 6/2017 |

*Primary Examiner* — Brenda C Bernardi

(74) *Attorney, Agent, or Firm* — Oblon, McClelland, Maier & Neustadt, L.L.P.

(57) ABSTRACT

There is provided a framework including systems and methods for analyzing skin parameters from images or videos showing skin. Using a series of Hierarchical Differential Image Filters (HDIF), it becomes possible to detect different skin features such as wrinkles, spots, and roughness. The hierarchical differential image filter computes two enhancements to an image showing skin at two different levels of enhancement, determines a differential image using the two enhancements and computes the skin analysis rating using the differential image. These skin ratings are comparably accurate to actual ratings by dermatologists.

27 Claims, 6 Drawing Sheets

Facial Image 902

Image Enhancement at Level U1 904

Image Enhancement at Level U2 906

Difference Image 908

Image Summation over Regions 910

Normalization 912

Skin Rating Coefficient 914

HIERARCHICAL DIFFERENTIAL IMAGE FILTERS FOR SKIN ANALYSIS

CROSS-REFERENCE TO RELATED APPLICATIONS

The application is a continuation of and claims the benefit of priority under 35 U.S.C. § 120 from U.S. application Ser. No. 15/589,184 filed May 8, 2017 (now U.S. Pat. No. 10,325,146 issued Jun. 18, 2019), and claims the benefit of priority from U.S. Provisional Application No. 62/333,258 filed May 8, 2016, the contents of each of which are incorporated herein by reference.

FIELD

The present application relates to image analysis, image filters, multi-scale image processing, video analysis, video filters and video processing, and, in particular, skin analysis such as for dermatological purposes.

BACKGROUND

The automatic evaluation and assessment of skin has been an area of intense investigation for several decades [1-9]. There have been numerous algorithms and methods to detect problem areas on the skin and to measure and monitor how these areas change over time [10]. In recent years, a combination of factors, including the wide availability of smartphones with significant processing capability and a high definition camera, have increased the level of interest in automatic skin assessment [9].

Prior skin evaluation methods can generally be divided into three groups. The first group utilizes image filters or transforms to highlight specific concerns which can then be closely investigated on the filtered image [2, 3, 4, 6]. These methods are fairly efficient, simple, and usually yield good results. A second group of methods enable users to provide feedback on a particular area which is then closely investigated (though region segmentation, color analysis, or other methods) [12,13]. This provides a more focused and accurate evaluation, but does require user intervention which may not always be possible or ideal. A third group of methods focus on machine learning for learning the characteristics of different skin conditions which are then employed to classify different parts of the skin [1, 5, 7, 8, 11]. The latter method provides significant potential for automatic skin diagnosis, but does require extensive labelled skin images which are usually not available [7, 8, 11].

In this work, we focus on the first method, namely to apply a hierarchical filter to the skin image from which we extract quantitative coefficients related to different set of general skin conditions including texture/evenness, wrinkles, and spots. Our goal at this stage of our research is to obtain a high level understanding of the skin rather than focus on a particular skin anomaly. This work is indirectly related (by similarity of subject matter) to our prior work on video filters for skin evaluation [9], although the actual problem and methods presented in this paper are entirely different than [9].

SUMMARY

There is provided A skin analysis unit comprising at least one processor configured to: analyze an image showing skin using a hierarchical differential image filter to determine and provide a skin analysis rating, wherein the hierarchical differential image filter computes two enhancements to the image at two different levels of enhancement, determines a differential image using the two enhancements and computes the skin analysis rating using the differential image.

The two different levels of enhancement define a skin analysis level configured to determine the skin analysis rating for a specific skin issue. The skin analysis unit may be configured to perform skin analysis using different skin analysis levels, applying respective hierarchical differential image filters. The different skin analysis levels may comprise two or more of:

Level 1—facial texture (roughness and imperfections);

Level 2—dark spots and small wrinkles; and

Level 3—deep wrinkles and folds;

to determine skin analysis ratings for each specific skin issue.

The hierarchical differential image filter may computes the two enhancements by applying a box blur function to the image at the two different levels of enhancement.

An adjusted differential image at level i may be computed using a differential image from each of level i and level i+1 to remove leakage.

The skin analysis unit may be configured to analyze a plurality of related images from a video (e.g. successive images of a same area of skin) using the hierarchical differential image filter to produce a candidate skin analysis rating for each of the plurality of images analyzed. A final skin analysis rating may be determined by selecting a maximum candidate skin analysis rating.

Method and other aspects are also disclosed.

BRIEF DESCRIPTION OF THE DRAWINGS

FIG. 7 is a set of three images showing the effect of motion blur on HDIF skin ratings.

DETAILED DESCRIPTION

Hierarchical Differential Image Filters (HDIF)

Consider a skin image I(x,y) and an image enhancement function Ω[I(x,y),u] with enhancement level u that can be applied to the image to create an enhanced image. The image enhancement could involve complex steps such as removing specific problem areas of the skin, or could include simpler smoothing or blurring effects. One computationally efficient realization of the enhancement function would be a box blur which can be implemented efficiently using integral images. A box blur, (also known as a box linear filter) is a spatial domain linear filter in which each pixel in the resulting image has a value equal to the average value of its neighbouring pixels in the input image. Other possible enhancement functions include Gaussian blurring functions, local median functions, histogram adjustments (where a function is applied to a local histogram), edge-reduction approaches (where the edge of the regions are removed as long as they are below a particular threshold), or a combination of the above. The enhancement level u corresponds to the intensity of the enhancement, with Ω[I(x,y),0]=I(x,y) (i.e. level 0 enhancement does nothing to the image). In the case of using the box blurring function, u would simply be the width of the blurring box expressed relative to the face size.

Now a differential image $D_{u,v}(x,y)$, with v>u may be defined as follows:

$$D_{u,v}(x,y)=\max(\Omega[I(x,y),v)]-\Omega[I(x,y),u],0) \quad \text{(Eq. I)}$$

Figure 1:
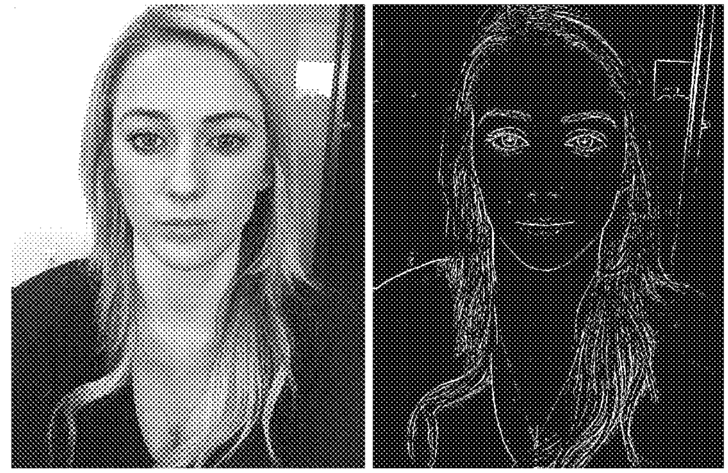
FIG. 1 is an example of a differential image (right) showing the difference between two different enhancement levels applied to the original image (left).

Essentially, the differential image is the difference between two enhancement levels with the idea that if the image is enhanced to remove problem areas, then the difference between two enhancement levels would be indicative of a particular type of skin problem. FIG. 1. is an example of a differential image (right) showing the difference between two different enhancement levels applied to the original image (left). The reason for the max operation is that most skin problem areas tend to be darker than the actual skin color, and hence to find these darker areas the maximum operation between successive enhancement levels would apply. For problem areas where the color is lighter than the skin tone, the max should be replaced by a −min (negative minimum) operation.

Observing the differential images, we can see that each image has a particular focus on the size and type of skin problems, but there is sometimes leakage from larger and more prominent problem areas. In order to reduce this level leakage, we can define the following adjusted images where the problem areas of the higher level i+1 are removed from the current level i:

$$D^*_{u_i,v_i}(x,y)=\max(D_{u_i,v_i}(x,y)-D_{u_{i+1},v_{i+1}}(x,y),0) \quad \text{(Eq. II)}$$

Please note that for the highest level computed (analyzed), where the differential image for the next level (i.e. highest level+1) is not available, a default (or zero value) for the differential image for the next highest level can be used. And finally, a level i skin rating coefficient that measures the total problems areas of the particular level can be computed or determined according to:

$$c_i = \sum_{x,y\in S} D^*_{u_i,v_i}(x, y) \quad \text{(Eg. III)}$$

where S is the set of skin pixels under evaluation. The skin analysis rating or coefficient may be normalized such as by scaling to a preferred range of values.

The S region may be defined based on the requirements of where the face is to be analyzed. For example, if the goal is to evaluate skin on the forehead, then the forehead pixels would be included in the region S. Or, if the cheeks are under evaluation, then S would comprise the pixels on the cheeks. Automated operations to determine the set S given the region of interest (e.g. forehead, cheeks, etc.) from a portrait image are known to persons of ordinary skill. The set S could be defined from user input e.g. annotating the image or simply by capturing an image of only the region of interest (i.e. not a portrait).

In the case of a box blurring function, with the box width being defined as a ratio of the face width (i.e. u corresponds to a percentage of the face width), then for the following set of level differential pairs:

Level 1→$\{u_0,v_0\}$={0%, 2%}

Level 2→$\{u_1,v_1\}$={0%, 5%}

Figure 2:
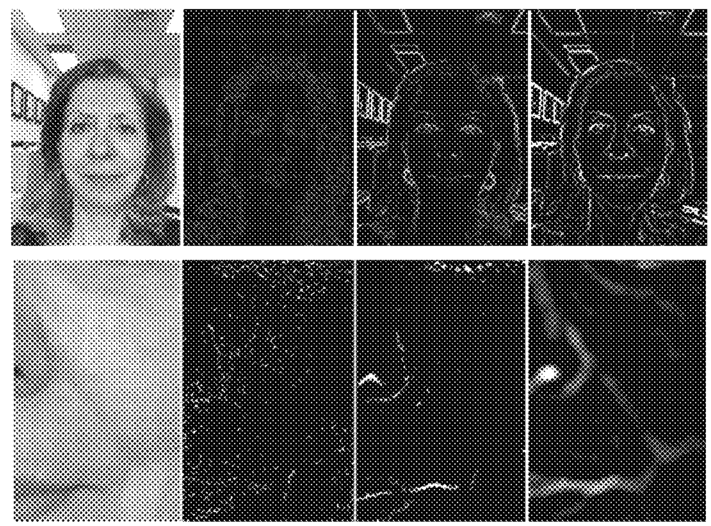
FIG. 2 is an example of a hierarchical differential image set applied to the original image (left), resulting in a first level image with roughness/texture (second from left), a second level image with dark spots (third from left), and a third level image with deep wrinkles (right).

Level 3→$\{u_2,v_2\}$={7%, 12%} differential images such as shown in FIG. 2 may be obtained where the leftmost images are the original images, and the respective Level 1, 2 and 3 images progress rightward from the respective original images. The original image in the bottom row is an enlargement of a portion of the original portrait image shown in the top row. As shown in FIG. 2, different levels are indicative of different facial features. For example, Level 1 image elements mostly correspond to the facial texture, roughness and imperfections. Unevenness of the skin is most evident in this image. Level 2 image elements capture dark spots or small wrinkles (such as those adjacent to the lip). Level 3 image elements capture deep wrinkles and folds, such as the under eye wrinkle and nasolabial folds. Though the examples herein reference skin of a subject's face, other skin surfaces may be similarly analyzed.

Dataset Generation

In order to evaluate our method's performance, we created a database consisting of 49 portrait images with varying degrees of facial wrinkles, spots, discolorations, and texture. A panel of three dermatologists with expertise in skin treatment and evaluation were assembled and asked to rate the conditions of each photo in the dataset on a 0-100% scale for each problem dimension (0%=no issues, 100%=significant skin issues). Although the data collected involved more extensive skin conditions, for the purposes of this paper, we will only evaluate the panel ratings for Deep Wrinkles, Skin Roughness, and Dark Spots.

Experimental Results

Figure 3:
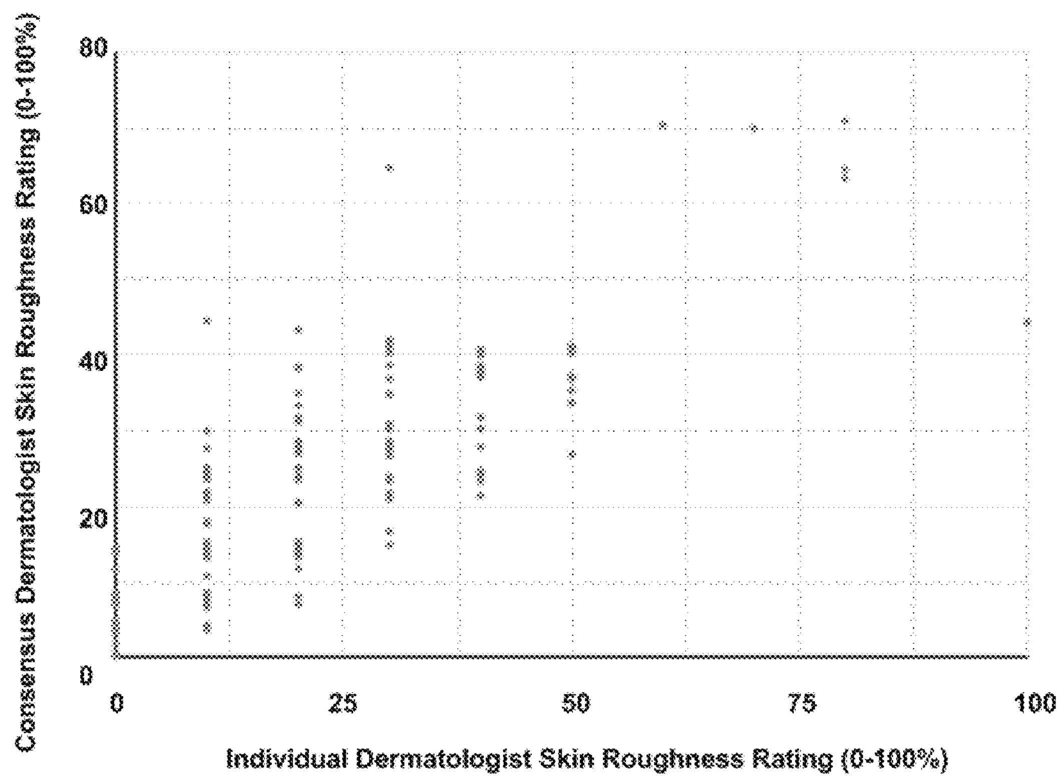
FIG. 3 is a scatter plot illustrating the relationship between the individual dermatologist ratings for skin roughness and the consensus (average) rating of all dermatologists' ratings for skin roughness.
Figure 4:
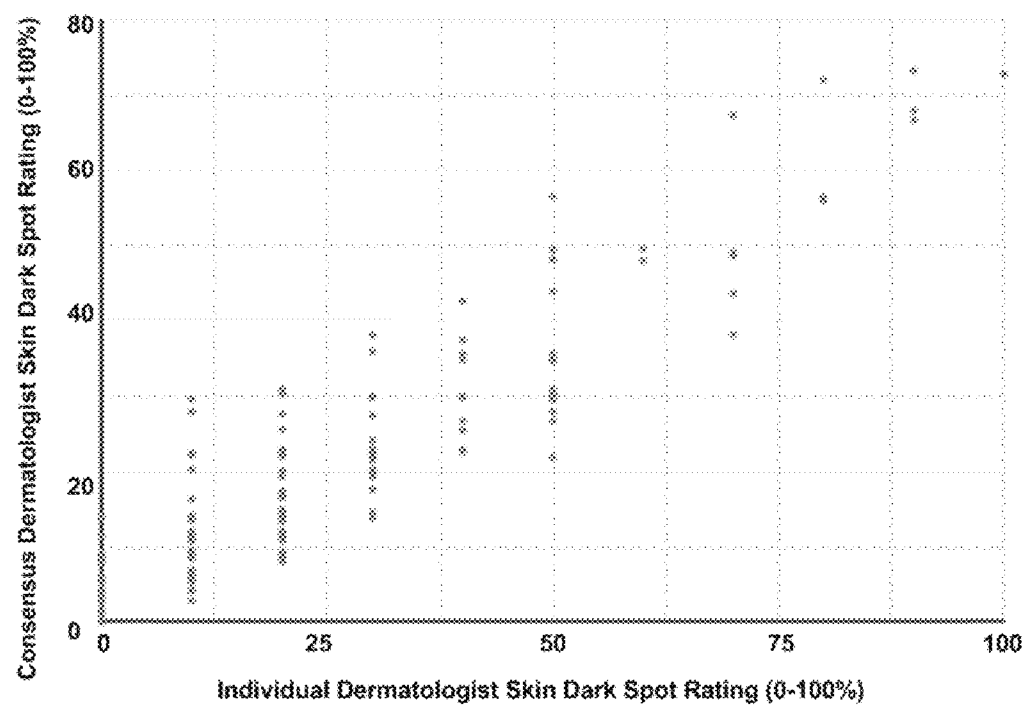
FIG. 4 is a scatter plot illustrating the relationship between the individual dermatologist ratings for dark spots and the consensus (average) rating of all dermatologists' ratings for dark spots.
Figure 5:
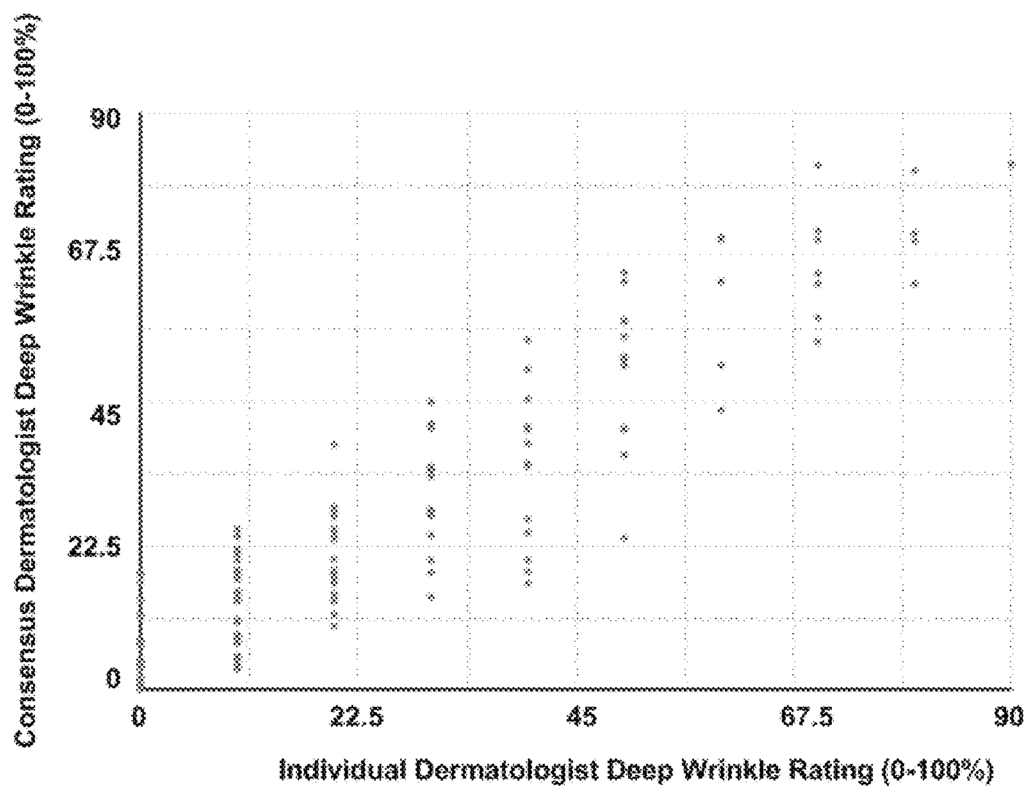
FIG. 5 is a scatter plot illustrating the relationship between the individual dermatologist ratings for deep wrinkles and the consensus (average) rating of all dermatologists' ratings for deep wrinkles.

The first step in analyzing the data collected was to compare the differences in dermatologist ratings to the consensus (average) rating from all dermatologists. FIGS. 3-5 are graphs (e.g. plots) illustrating the rating differences between each dermatologist and the consensus ratings. FIG. 3 is a scatter plot illustrating the relationship between the individual dermatologist ratings for skin roughness and the consensus (average) rating of all dermatologists' ratings for skin roughness. FIG. 4 is a scatter plot illustrating the relationship between the individual dermatologist ratings for dark spots and the consensus (average) rating of all dermatologists' ratings for dark spots. FIG. 5 is a scatter plot illustrating the relationship between the individual dermatologist ratings for deep wrinkles and the consensus (average) rating of all dermatologists' ratings for deep wrinkles. As shown in these graphs, there is a noticeable variation between the individual dermatologist ratings and the consensus, indicating that even an expert evaluation of the skin will have a moderate degree of variability.

In order to compare our proposed HDIF method with the ratings from dermatologists, we ran the HDIF rating estimates on all 49 images. We then compared the average rating error from the HDIF ratings with that of the consensus (average) rating from all dermatologists. Table I shows the average rating errors for different skin concerns comparing the individual dermatologists with the consensus (average) dermatologist rating, as well as HDIV skin rating estimates as compared to the consensus rating:

TABLE I

| Evaluation Dimension | Average Rating Error For Individual Dermatologist vs. Consensus | Average Rating Error For HDIF vs. Consensus |
|---|---|---|
| Skin Roughness | 8.2% | 11.3% |
| Dark Spots | 7.4% | 17.6% |
| Deep Wrinkles | 6.5% | 15.6% |

As shown, the HDIF ratings have a higher error as compared to the individual dermatologists. However, these errors are essentially within 10% of the dermatologist ratings. Certain skin features such as roughness have a much closer HDIF estimate as compared to the dermatologist estimate. If we breakdown the ratings error among the moderate problem images (those with a consensus rating below 4) and intense (those with a consensus rating above 4), we see that more intense problem areas usually correspond to higher errors for both HDIF and dermatologists. Table II shows a breakdown of dermatologist rating errors and HDIF rating errors for moderate and intense skin conditions:

TABLE II

| Evaluation | Average Rating Error For Individual Dermatologist vs. Consensus | | Average Rating Error For HDIF vs. Consensus | |
|---|---|---|---|---|
| Dimension | Moderate | Intense | Moderate | Intense |
| Skin Roughness | 7.4% | 13.3% | 10.0% | 18.9% |
| Dark Spots | 7% | 9.1% | 16% | 24.6% |
| Deep Wrinkles | 6.2% | 7.6% | 13.4% | 22.3% |

Figure 6:
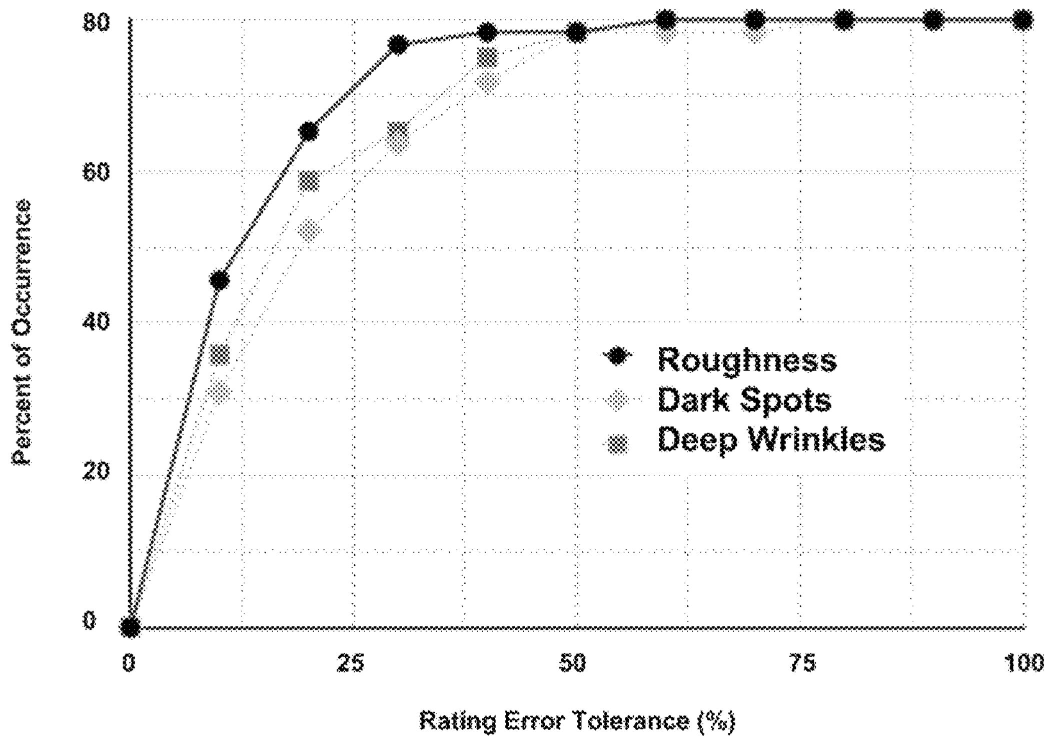
FIG. 6 is a graph illustrating the number of images whose HDIF rating estimates fall within a particular range of the dermatologist consensus ratings.

Another view of our data is to see what percentage of HDIF rating estimates are within a particular range. FIG. 6 is a graph illustrating the number of images whose HDIF rating estimates fall within a particular range of the dermatologist consensus ratings. The best HDIF results are obtained for skin roughness, followed by deep wrinkles and dark spots. For skin roughness over 88% of the dataset images had a rating error less than 25%. For deep wrinkles, that number is 78% and for dark spots it drops to 72%.

Based on our analysis, although dermatologists are clearly more capable at rating facial images than our HDIF approach, the difference between HDIF and the dermatologist consensus ratings is actually fairly small (having a max average difference of 10.2% for dark spot ratings). This indicates that our HDIF scores can be used as a possible metric for the assessment of skin.

Practical Considerations for Video

An intended goal for the skin evaluation framework disclosed herein is to apply the techniques to live video by performing scans on each frame and combining the results from successive frames. A first concern with such an implementation is the computational complexity of the process for real-time performance on high definition video frames. Since the box blur can be computed efficiently using integral images, and since all other steps are pixel additions and/or subtractions, the operations can be composed of a series of addition/subtractions per pixel as well as max calculations and memory transfer operations. As a result of the above, the approach is well suited to real-time video implementation.

Figure 7:
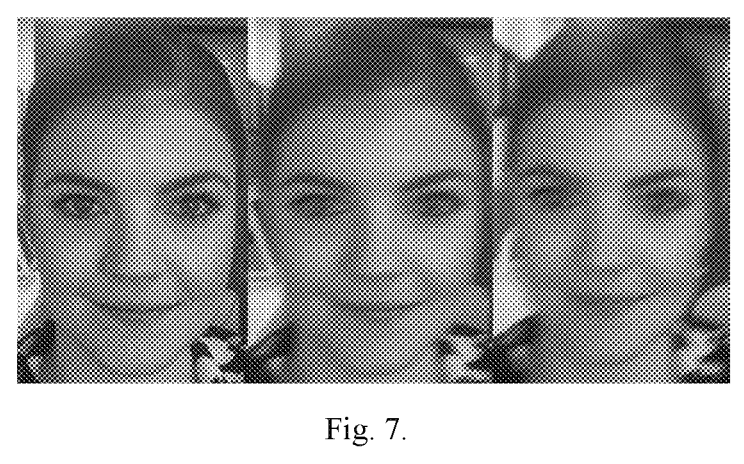

The second consideration with video is that of motion blur, which can cause blurring on the image thereby resulting in erroneous scores. FIG. 7 is a set of three images of the same person with different levels of motion blur. The low blur image (left) has a HDIF Deep Wrinkle rating of 8.7%. The moderate blur image (center) has a HDIF Deep Wrinkle rating of 5.1%. The high blur image (right) has a HDIF Deep Wrinkle rating of 4.0%. Similar drops were observed in the HDIF Roughness and Dark Spot ratings.

As shown, the higher the level of motion blur the lower the skin ratings. As a result, it is important to use video frames that have a low image blur. Since this is not always easily detectable, one simple solution is to use the maximum ratings across a set of frames since the maximum rating usually corresponds to the least blurry frame.

Example Computing Unit Implementation

Figure 8:
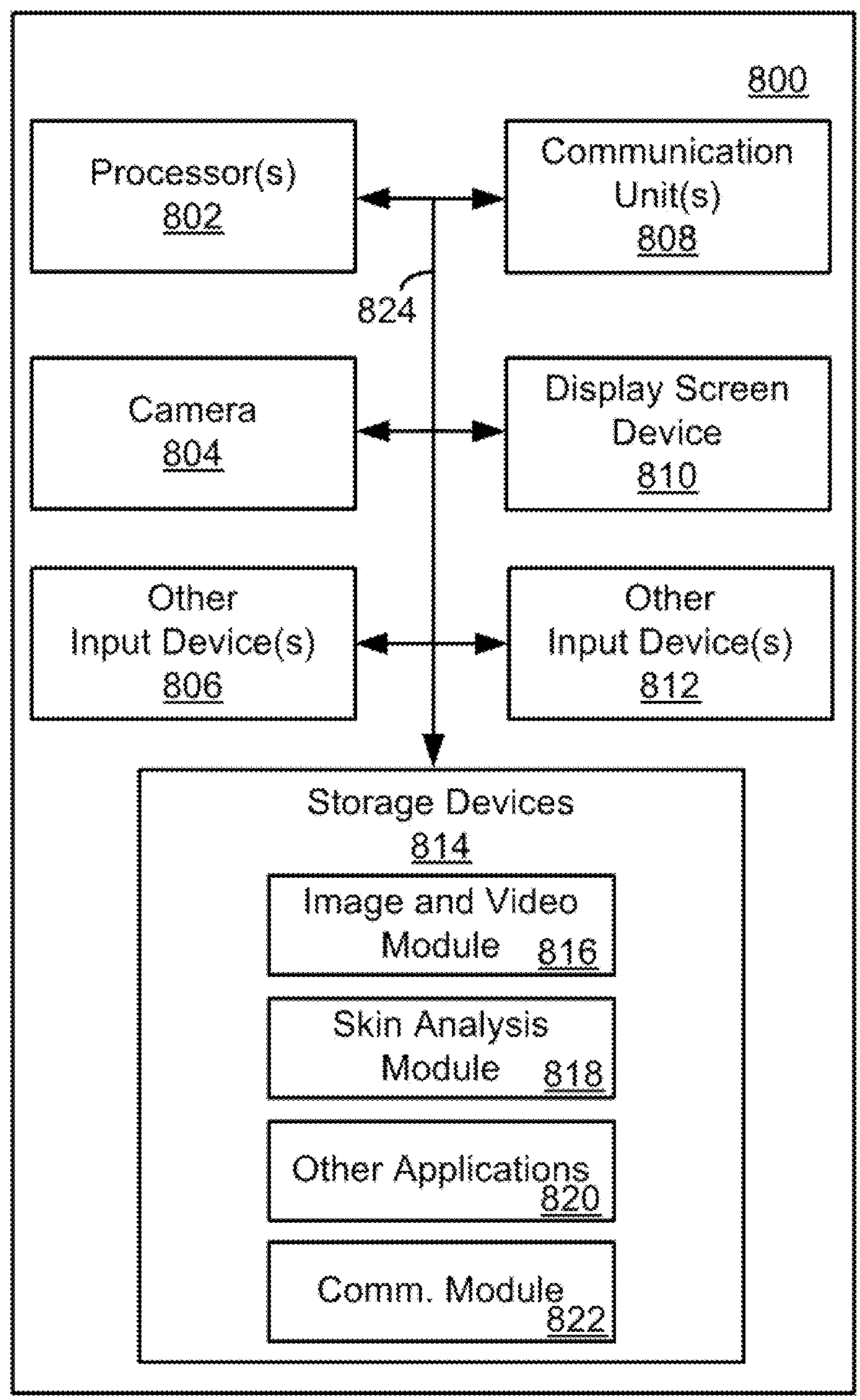
FIG. 8 is a block diagram of a computing unit configured as a skin analysis unit in accordance with an embodiment.

FIG. 8 is a block diagram showing a representative and simplified computing unit 800. Computing unit 800 comprises one or more processors 802, camera 804, other input devices 806, communication units 808, display screen device 810, other output devices 812 and one or more storage devices 814. Storage devices 814 store software (instructions to configure the one or more processors, communication units, etc.) as well as data (e.g. source images or video, processed images or video, skin analysis data and coefficients, etc.) Representative modules in storage devices 814 include an image and video module (e.g. a camera module) for taking and displaying images and video 816, a skin analysis module 818, other applications 820 and a communications module 822. Other applications may include a browser, email, instant messaging, SMS/MMS or other communication application, games, etc. A bus 824 couples the components for communication. Display screen device 810 may be a touch screen or otherwise configured for I/O operation. Other input devices 806 may include a keyboard, one or more buttons, a microphone, biometric sensors, etc. Other output devices may include LED or other lights, a speaker, an audio jack, bell, vibratory (haptic) devices, etc. Communication units may include radio and antenna components (e.g. for short and/or long range wireless communication), USB or other interface for serial bus or other wired communication components, etc. Storage devices 814 may be RAM, ROM, flash or other media types or other storage device components. Storage devices 814 typically store other software components (not shown) such as operating system(s), etc., as will be appreciated by a person of ordinary skill. Processors are typically microprocessors or CPUs. Other processing device configurations are possible. While the instruction components are shown as software in storage devices, aspects may be configured as hardware.

Computing unit 800 may be a smartphone, lap top, work station, server, kiosk, or other computer. Though each of the components 802-824 of computing unit 800 are shown "on board" some components such as an external/remote camera or external/remote display screen may be coupled to the computing unit 800 for communication. Preferably the camera is capable of sufficient definition to show the skin issues, for example with 640×480 (e.g. VGA), or higher resolution. Though a single device is shown it is understood that the operations and methods discussed herein may be undertaken using more than one computing unit and all of same may have different configurations. For example, one computing unit may capture an image (or video) and provide it to another computing unit for analysis such as in a cloud computing configuration or other client-server arrangement (not shown).

Figure 9:
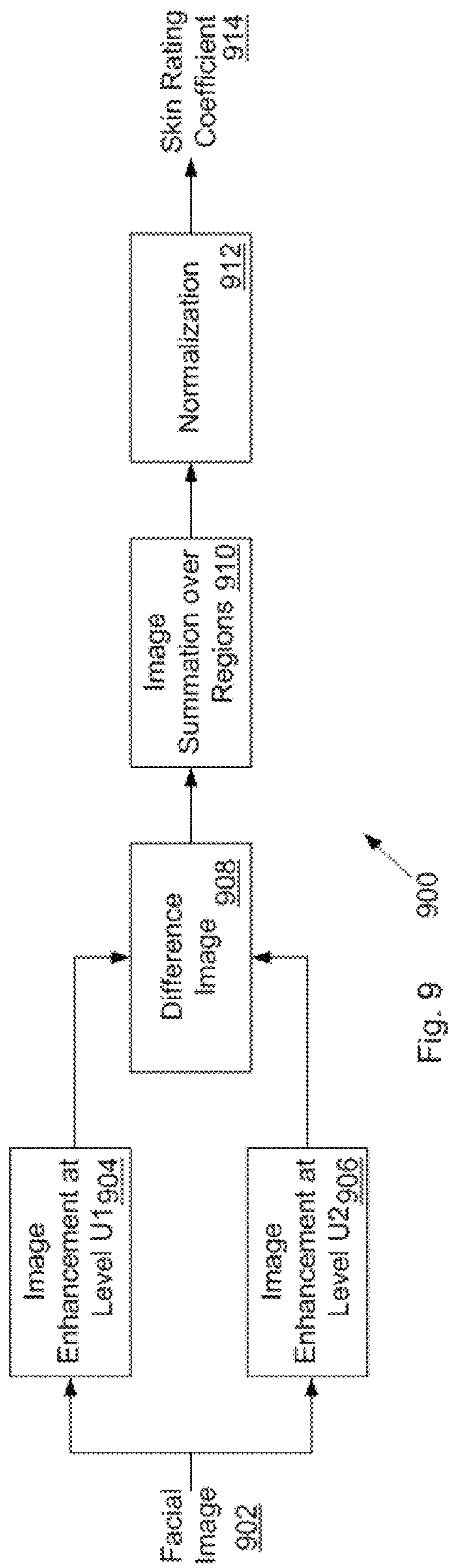
FIG. 9 is a block diagram of a skin analysis module of a computing unit in accordance with an embodiment.

FIG. 9 shows a block diagram of components 900 of the skin analysis module 818 to process a source facial image 902. A flow of operations may be understood from same.

It is understood that the source image may be a video. Components 904 and 906 are image processing components which perform image enhancement at respective levels U1 and U2 as discussed above. The image enhancement function may be a box blur function using one of the level pairs Level 1, Level 2 or Level 3 described above. The enhanced images resulting from this respective processing are provided to a difference image component 908 to compute a difference image (for example using Eq. II as discussed above). The difference image is provided to a summation component 910 to compute the image summation over skin regions of interest, for example, according to Eq. III. Though not shown a skin area determining component may perform operations to determine the skin pixels from the image. The output thereof (e.g. a sum) may be normalized (e.g. defined over a preferred range of values) and a skin analysis rating or coefficient produced.

The skin analysis module 818 may be configured to determine a skin analysis coefficient using each or only some of the Level 1, 2 and 3 pairs to determine 1) the facial texture, roughness and imperfections (unevenness of the skin), 2) dark spots or small wrinkles, and/or 3) deep wrinkles and folds respectively. The analysis may be selective (e.g. to allow a user to choose the level to be used or the skin issue to be analyzed). Though not shown the coefficient may be provided to a user of computing unit 800 such as via display screen device 810 or communicated to another computing unit for presentation or stored to a data store (not shown) for later retrieval and/or other use.

Computing unit 800 configured to determine the skin analysis coefficient may be considered to be a skin analysis unit. The skin analysis unit is thus one or more processors configured to analyze an image showing skin using a hierarchical differential image filter to determine a skin analysis rating. The hierarchical differential image filter computes two enhancements to the image of the skin at respective levels of enhancement, determines a differential image from the two enhancements and computes a skin analysis rating from the differential image. The image may a still image or an image from a video.

In a video context, a plurality of related images from a video (e.g. successive images of the same area of skin) may be analysed to produce a plurality of candidate skin analysis ratings, one for each of the plurality of images analyzed. A final skin analysis rating may be determined by selecting a maximum rating from the plurality of candidate skin analysis ratings so as to account for image blur in the related images.

The image may be analyzed at different enhancement levels (e.g. Level 1, Level 2, Level 3) to provide skin analysis ratings for respective skin issues. The analysis may be selective to analyze one or more selected levels or skin issues.

One or more method aspects will be apparent from the foregoing description. A computer storage product may be defined to configure a computing unit having one or more processors to be a skin analysis unit. The storage product may be a storage device storing instructions in a non-transient manner which instructions when executed configure the one or more processors to perform as described herein.

CONCLUSION

A framework including systems and methods for analyzing skin parameters from images or videos is disclosed. Using a series of Hierarchical Differential Image Filters, different skin features such as wrinkles, spots, and roughness are detectable and skin ratings may be computed. It will be apparent that modifications may be made by a person of ordinary skill to the teachings herein yet remain within the scope. For example, the image may not be a portrait per se of the subject. The image may be a portion of a face or other area of the subject's body. The image may include other surfaces other than skin, such as clothing, accessories, background, glasses, etc. which other surfaces may be removed from the rating analysis such as by defining the set S appropriately.

REFERENCES

[1] Phung, S. L., Bouzerdoum, A. and Chai, D., 2005. Skin segmentation using color pixel classification: analysis and comparison. Pattern Analysis and Machine Intelligence, IEEE Trans. on, 27(1), pp. 148-154.

[2] Tsumura, N., Ojima, N., Sato, K., Shiraishi, M., Shimizu, H., Nabeshima, H., Akazaki, S., Hori, K. and Miyake, Y., 2003. Image-based skin color and texture analysis/synthesis by extracting hemoglobin and melanin information in the skin. ACM Transactions on Graphics (TOG), 22(3), pp. 770-779

[3] Sanders, J. E., Goldstein, B. S., Leotta, D. F. and Richards, K. A., 1999. Image processing techniques for quantitative analysis of skin structures. Computer methods and programs in biomedicine, 59(3), pp. 167-180.

[4] Tsumura, N., Haneishi, H. and Miyake, Y., 1999. Independent-component analysis of skin color image. JOSA A, 16(9), pp. 2169-2176.

[5] Binder, M., Kittler, H., Seeber, A., Steiner, A., Pehamberger, H. and Wolff, K., 1998. Epiluminescence microscopy-based classification of pigmented skin lesions using computerized image analysis and an artificial neural network. Melanoma research, 8(3), pp. 261-266.

[6] Chung, D. H. and Sapiro, G., 2000. Segmenting skin lesions with partial-differential-equations-based image processing algorithms. Medical Imaging, IEEE Transactions on, 19(7), pp. 763-767.

[7] Cruz-Roa, A. A., Ovalle, J. E. A., Madabhushi, A. and Osorio, F. A. G., 2013. A deep learning architecture for image representation, visual interpretability and automated basal-cell carcinoma cancer detection. In Medical Image Computing and Computer-Assisted Intervention—MICCAI 2013 (pp. 403-410). Springer Berlin Heidelberg.

[8] Luo, P., Wang, X. and Tang, X., 2013. A deep sum-product architecture for robust facial attributes analysis. In Proceedings of the IEEE International Conference on Computer Vision (pp. 2864-2871).

[9] Alaei Novin, I. and Aarabi, P., 2014, October. Skin lens: Skin assessment video filters. In Systems, Man and Cybernetics (SMC), 2014 IEEE International Conference on (pp. 1033-1038). IEEE. Vancouver.

[10] Aarabi, P., 2014. System, method and application for skin health visualization and quantification. U.S. patent application Ser. No. 14/185,321.

[11] Aarabi, P., Manashirov, B., Phung, E., and Lee, K., Precise Skin-Tone and Under-Tone Estimation by Large Photo Set Information Fusion, 2015 IEEE International Workshop on Multimedia Information Processing and Retrieval, Miami.

[12] Zelickson, B. D., Walgrave, S. E., Al-Arashi, M. Y. H., Altshuler, G. B., Yaroslaysky, I. V., Childs, J. J., Cohen, R. H., Erofeev, A. V., Depina, E. F., Smirnov, M. Z. and Kist, D. A., 2009. Semi Automated method of analysis of horizontal histological sections of skin for objective evaluation of fractional devices. Lasers in surgery and medicine, 41(9), pp. 634-642.

[13] Parolin, A., Herzer, E. and Jung, C. R., 2010, August. Semi-automated diagnosis of melanoma through the analysis of dermatological images. In Graphics, Patterns and Images (SIBGRAPI), 2010 23rd SIBGRAPI Conference on (pp. 71-78). IEEE.

The invention claimed is:

1. A skin analysis unit comprising at least one processor configured to:

analyze a plurality of related images from a video showing skin using a hierarchical differential image filter to determine a plurality of candidate skin analysis ratings from each image of the plurality of related images, wherein the hierarchical differential image filter computes two enhancements to each image at two different levels of enhancement, determines a differential image using the two enhancements and computes one of the candidate skin analysis ratings from the differential image; and determine and provide a final skin analysis rating from the plurality of candidate skin analysis ratings.

2. The skin analysis unit of claim 1 wherein the final skin analysis rating is determined by selecting a maximum rating from the plurality of candidate skin analysis ratings.

3. The skin analysis unit of claim 1 wherein the plurality of related images are selected from successive images of a same area of skin from the video.

4. The skin analysis unit of claim 1 wherein the two different levels of enhancement define a skin analysis level configured to determine each of the candidate skin analysis ratings for a specific skin issue.

5. The skin analysis unit of claim 4 configured to perform skin analysis using different skin analysis levels, applying respective hierarchical differential image filters wherein the different skin analysis levels comprise two or more of:

Level 1—facial texture comprising roughness and imperfections;

Level 2—dark spots and small wrinkles; and

Level 3—deep wrinkles and folds;

to determine respective skin analysis ratings for each specific skin issue.

6. The skin analysis unit of claim 1 wherein the hierarchical differential image filter computes the two enhancements by applying a box blur function to each image of the plurality of related images at the two different levels of enhancement.

7. The skin analysis unit of claim 1 wherein each image of the plurality of images is respectively defined by I(x,y) and the hierarchical differential image filter applies an image enhancement function Ω[I(x,y),u] with enhancement level u corresponding to the intensity of the enhancement, with Ω[I(x,y),0]=I(x,y).

8. The skin analysis unit of claim 7 wherein each respective differential image is generally defined by $D_{u,v}(x,y)$, with v>u such that:

$$D_{u,v}(x,y)=\max(\Omega[I(x,y),v)]-\Omega[I(x,y),u],0) \quad \text{(Eq. I)}$$

wherein a max operation is performed for skin problem areas that are darker than actual skin tone and a −min (negative minimum) operation is performed for skin problem areas that are lighter than actual skin tone.

9. The skin analysis unit of claim 8 configured to analyse each image of the plurality of related images at different skin analysis levels i and i+1 using respective hierarchical differential image filters and wherein the differential image for level i is determined from an adjusted image where skin problem areas of the higher level i+1 are removed from the current level i.

10. The skin analysis unit of claim 1 wherein:

the image enhancement function is a box blurring function having a box width determining a level of enhancement (i) applied to each image of the plurality of related images; and for each level i, the hierarchical differential image filter applies box widths $u_i$ and $v_i$ where each respective box width is defined as a respective ratio of a face width of a face in each image of the plurality of related images.

11. The skin analysis unit of claim 10 configured to perform skin analysis using at least one of a plurality of different skin analysis levels, applying respective hierarchical differential image filters wherein the different skin analysis levels are selected from:

Level 1→$\{u_0,v_0\}=\{0\%, 2\%\}$;

Level 2→$\{u_1,v_1\}=\{0\%, 5\%\}$; and

Level 3→$\{u_2,v_2\}=\{7\%, 12\%\}$.

12. The skin analysis unit of claim 1 configured to normalize the final skin analysis rating.

13. The skin analysis unit of claim 1 comprising either an on-board camera or a remote camera coupled to the unit and wherein the unit is configured to capture the video using the on-board camera or remote camera.

14. A method of skin analysis comprising:

analyzing a plurality of related images from a video showing skin using a hierarchical differential image filter to determine a plurality of candidate skin analysis ratings from each image of the plurality of related images, wherein the hierarchical differential image filter computes two enhancements to each image at two different levels of enhancement, determines a differential image using the two enhancements and computes one of the candidate skin analysis ratings from the differential image; and determine and provide a final skin analysis rating from the plurality of candidate skin analysis ratings.

15. The method of claim 14 wherein determining the final skin analysis rating comprises selecting a maximum rating from the plurality of candidate skin analysis ratings.

16. The method of claim 14 comprising selecting the plurality of related images from successive images of a same area of skin from the video.

17. The method of claim 14 wherein the two different levels of enhancement define a skin analysis level configured to determine each of the candidate skin analysis ratings for a specific skin issue.

18. The method of claim 17 comprising performing skin analysis using different skin analysis levels, applying respective hierarchical differential image filters wherein the different skin analysis levels comprise two or more of:

Level 1—facial texture comprising roughness and imperfections;

Level 2—dark spots and small wrinkles; and

Level 3—deep wrinkles and folds;

to determine respective skin analysis ratings for each specific skin issue.

19. The method of claim 14 comprising using the hierarchical differential image filter to compute the two enhancements by applying a box blur function to each image of the plurality of images at the two different levels of enhancement.

20. The method of claim 14 wherein each of the plurality of images of the skin is respectively defined by I(x,y) and wherein using the hierarchical differential image filter applies an image enhancement function $\Omega[I(x,y),u]$ with enhancement level u corresponding to the intensity of the enhancement, with $\Omega[I(x,y),0]=I(x,y)$.

21. The method of claim 20 wherein each respective differential image is generally defined by $D_{u,v}(x,y)$, with v>u such that:

$$D_{u,v}(x,y)=\max(\Omega[I(x,y),v)]-\Omega[I(x,y),u],0) \quad \text{(Eq. I)}$$

wherein a max operation is performed for skin problem areas that are darker than actual skin tone and a −min (negative minimum) operation is performed for skin problem areas that are lighter than actual skin tone.

22. The method of claim 21 comprising analysing each image of the plurality of related images at different skin analysis levels i and i+1 using respective hierarchical differential image filters and wherein the differential image for level i is determined from an adjusted image where skin problem areas of the higher level i+1 are removed from the current level i.

23. The method of claim 14 wherein:

the image enhancement function is a box blurring function having a box width determining a level of enhancement (i) applied to each image of the plurality of related images; and for each level i, the hierarchical differential image filter applies box widths $u_i$ and $v_i$ where each respective box width is defined as a respective ratio of a face width of a face in each image of the plurality of related images.

24. The method of claim 23 comprising performing skin analysis using at least one of a plurality of different skin analysis levels, applying respective hierarchical differential image filters wherein the different skin analysis levels are selected from:

Level 1→$\{u_0,v_0\}=\{0\%, 2\%\}$;

Level 2→$\{u_1,v_1\}=\{0\%, 5\%\}$; and

Level 3→$\{u_2,v_2\}=\{7\%, 12\%\}$.

25. The method of claim 14 comprising normalizing the final skin analysis rating.

26. The method of claim 14 comprising capture the video using a camera on-board or coupled to a skin analysis unit configured to perform the method.

27. A computer program product comprising a storage device storing instructions in a non-transient manner to configure one or more processors when executed to provide a skin analysis unit, the one or more processors configured to:

analyze a plurality of related images from a video showing skin using a hierarchical differential image filter to determine a plurality of candidate skin analysis ratings from each image of the plurality of related images, wherein the hierarchical differential image filter computes two enhancements to each image at two different levels of enhancement, determines a differential image using the two enhancements and computes one of the candidate skin analysis ratings from the differential image; and determine and provide a final skin analysis rating from the plurality of candidate skin analysis ratings.

* * * * *